W. H. NELSON.
DIRIGIBLE HEADLIGHT.
APPLICATION FILED DEC. 27, 1913.

1,118,218.

Patented Nov. 24, 1914

WITNESSES:

INVENTOR,
William H. Nelson,
G. C. Kennedy,
ATTORNEY.

UNITED STATES PATENT OFFICE.

WILLIAM H. NELSON, OF HAZLETON, IOWA.

DIRIGIBLE HEADLIGHT.

1,118,218.  Specification of Letters Patent.  Patented Nov. 24, 1914.

Application filed December 27, 1913. Serial No. 308,941.

*To all whom it may concern:*

Be it known that I, WILLIAM H. NELSON, a citizen of the United States of America, and a resident of Hazleton, Buchanan county, Iowa, have invented certain new and useful Improvements in Dirigible Headlights, of which the following is a specification.

Figure 1:
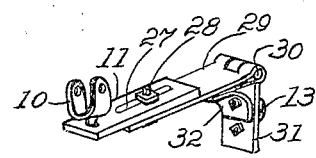
Figure 2:
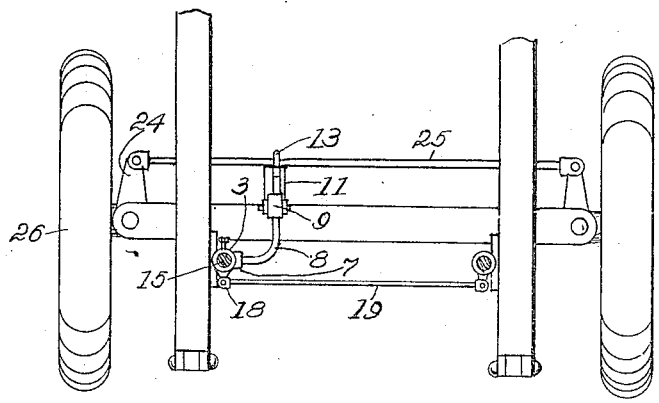
Figure 2:
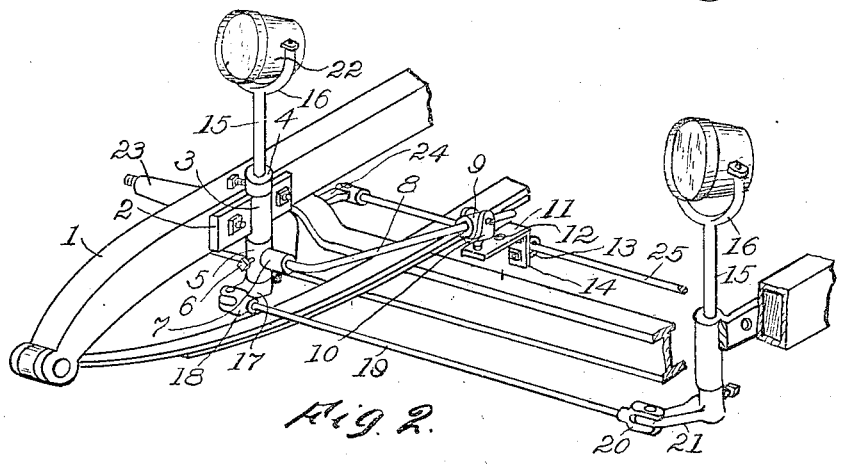

My invention relates to improvements in dirigible headlights of motor-cars, or other vehicles, and the object of my improvement is to furnish means movably connected between a movable lamp support and the shifting-rod for the stub axles of such vehicle, which will be suitable to transmit movement from said shifting-rod to said lamp support, to rock the latter angularly sidewise to conform to the like angular rocking sidewise of the vehicle wheels controlled by said shifting rod. This object I have accomplished by the means which are hereinafter described and claimed, and which are illustrated in the accompanying drawings, in which:

Figure 1 is an upper plan view of the forward part of a vehicle or motor-car, having my improved movement transmission means connected between the lamp supports and the wheel shifting-rod. Fig. 2 is a perspective view of the parts shown in Fig. 1, with parts broken away. Fig. 3 is an enlarged detail perspective view of a modified form of hinged bracket, being a part of said device.

Similar numerals of reference denote corresponding parts throughout the several views.

A plate 2 is secured to one of the frame bars 1 of the vehicle, and has an integral vertical hollow cylindrical bearing 3 adapted to movably receive the vertical standard 15 of the lamp supporting forks 16, the lamp being shown at 22. A collar 4 is secured upon said standard 15 by means of a set-screw, and keeps the standard in the proper position relative to the sleeve-bearing 3. The lower end of the standard projects downwardly below the bearing 3, and has secured thereon a sleeve 5 by means of a set-screw 6, said sleeve having a horizontal integral socket 7 adapted to movably receive the forward end of the bent rod or arm 8 for up and down rocking movements, the rear part of said rod being carried horizontally to the rear and received slidably within the sleeve 9. The sleeve 9 forms one part of a universal joint or coupling 10, which latter is pivotally mounted on the forward end of the horizontal portion 11 of the bent bracket 14 and the lower portion of said bracket is secured to the shifting rod 25 by means of a U-bolt 13. The shifting-rod 25 has its ends pivotally connected to arms 24 fixedly projecting from the stub axles 23 of the forward carrying wheels 26 of the motor-car or vehicle. The numerals 17 and 21 denote like arms integrally projected from sleeves which are secured by means of set-screws to the lower ends of the two standards 15. A rod 19 is connected by means of pivotal couplings 18 and 20 at either end to said arms 17 and 21.

In Fig. 3 is shown a modification of the bracket 11—14. While in Fig. 2, one or more orifices 12 are provided in the part 11 of said bracket to receive adjustably the universal coupling 10, the modified device shown in Fig. 3 shows the coupling 10 pivotally mounted on a plate 11, which latter has a longitudinal slot 27 adapted to register with a like slot in the horizontal plate 29, and being secured adjustably thereto by means of a bolt 28. The plate 29 has a hinged joint 30 to the upper end of the bracket 31, and the latter is secured to the shifting-rod 25 by means of the U-bolt 13. In order to keep the plate 29 up in its proper horizontal position, a plate spring 32 is mounted on the bracket 31 and has its upper end movably engaged with the lower surface of the plate 29, to yieldingly support the latter.

It is obvious that when the shifting-rod 25 is moved in either direction transversely of the vehicle, and while it is rocking the arms 24 to change the angular positions of the wheels 26 relative to said vehicle, that my above described movable connecting means will be influenced by said shifting-rod to rock the said lamp-standards 15 sidewise appropriately to cause them to take approximately the same angular position relative to said vehicle as said wheels 26. In this way, when the direction of the vehicle is thus changed, the light cast by said lamps is always directly in the changed direction of movement of the vehicle. It should be observed, that since the rod 8 is not only pivotally connected to the lamp support 15, but is also slidably connected with the universal couplings 9—10 of said bracket 11—14, that the arm 8 is permitted to rock up and down so that any up and down movement of the wheels 26 with their connected axles and arms 24 and the shifting-rod 25 will not at all affect the lamps 22. The use of the rod 19 as pivotally connected between the arms 17 and 21 secured on the said lamp-standards, permits both lamps 22 to be simultaneously shifted in the same angle of movement.

The whole device is very simple, inexpensive, and easily applied for use on any vehicle of the kind described, and in which the adjusting means shown in either Fig. 2 or Fig. 3 may be used for the purpose.

Having described my invention, what I claim as new, and desire to secure by Letters Patent, is:

1. The combination with a lamp-support mounted to be rocked from side to side, and the shifting-rod of the stub-axles of a vehicle, of means for rocking said lamp-support connected to said shifting-rod, comprising a body detachably and adjustably mounted on said lamp-support and having a side-bearing projecting therefrom. an arm pivotally mounted in said bearing, a body secured to said shifting-rod, having a universal-coupling pivotally mounted thereon to rock from side to side, the other end of said pivoted arm being slidably connected to said universal coupling.

2. The combination with a lamp-support mounted to be rocked from side to side, and the shifting-rod of the stub-axles of a vehicle, of means for rocking said lamp-support, comprising an arm pivotally connected to said lamp support, a bracket secured to said shifting-rod, a plate hinged to said bracket, a sleeve slidably mounted on the rear part of said pivoted arm, said sleeve being mounted adjustably on said plate and adapted for both sidewise and up and down rocking movements, and a spring mounted on said bracket and engaging the plate hinged thereto.

3. The combination with lamp-supports pivotally mounted for sidewise rocking movements, like cranks on said lamp-supports, a bar having its ends pivotally connected to said cranks, and the shifting-rod of the stub-axles of a vehicle, of means for rocking said lamp-supports simultaneously in the same direction, comprising a socketed body mounted on one of said lamp-supports, a rod having one end pivoted in said socketed body for up and down rocking movements, a bracket secured to said shifting-rod, a universal joint mounted on said bracket, the rear end of said pivoted rod being slidably connected to said universal joint.

Signed at Waterloo, Iowa this 19th day of Dec. 1913.

WILLIAM H. NELSON.

Witnesses:
 W. H. BRUNN,
 GEO. C. KENNEDY.